Jan. 30, 1940.  C. H. BOCK  2,188,453
BRAKE
Filed Oct. 8, 1937   2 Sheets-Sheet 1
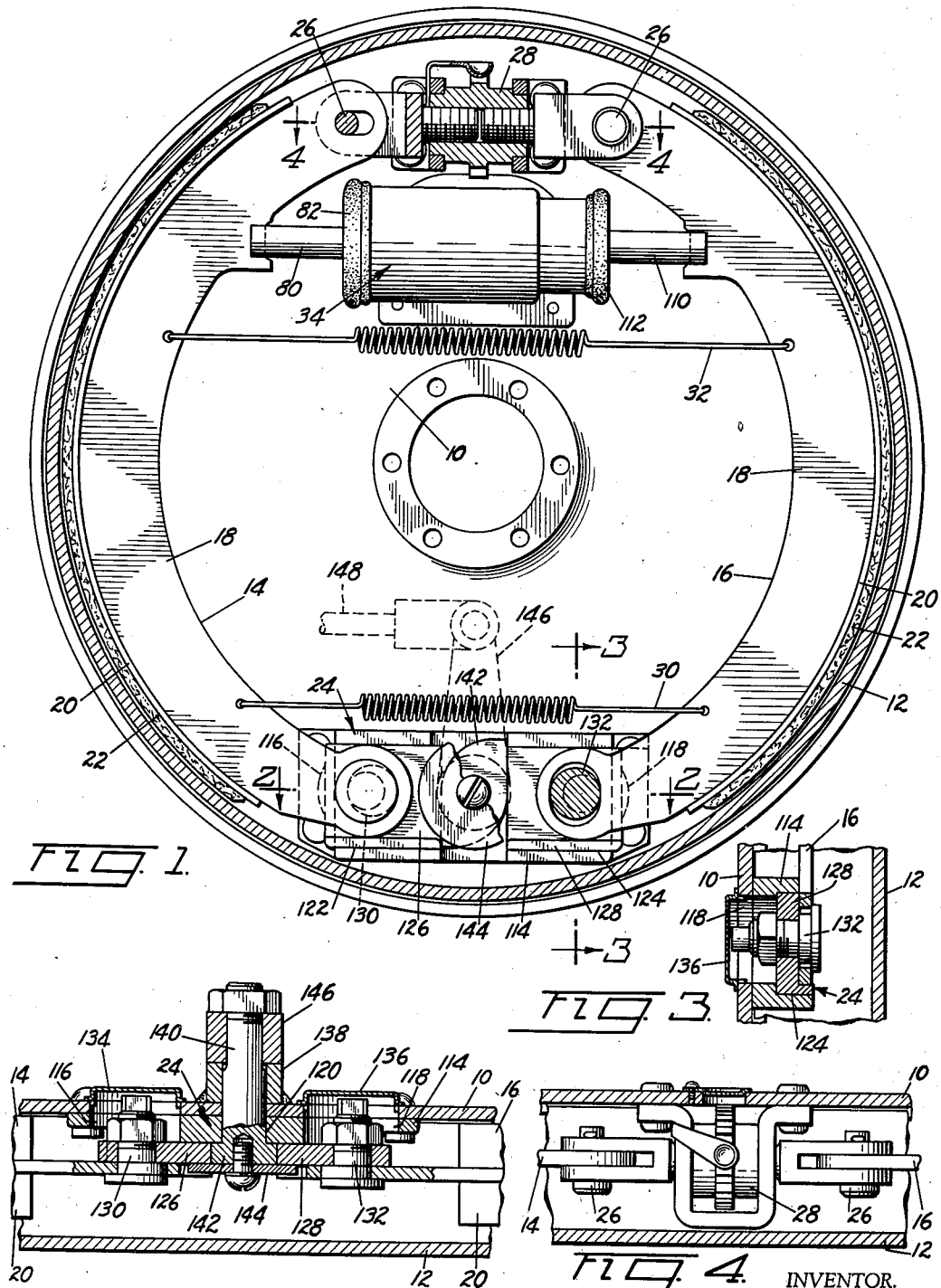
INVENTOR.
CLARENCE H. BOCK
ATTORNEYS.

Jan. 30, 1940.   C. H. BOCK   2,188,453
BRAKE
Filed Oct. 8, 1937   2 Sheets-Sheet 2

INVENTOR.
CLARENCE H. BOCK
BY
Williams, Bradbury, McCaul & Hinkle
ATTORNEYS.

Patented Jan. 30, 1940

2,188,453

UNITED STATES PATENT OFFICE 2,188,453

BRAKE

Clarence H. Bock, Detroit, Mich., assignor to Hydraulic Brake Company, Detroit, Mich., a corporation of California Application October 8, 1937, Serial No. 167,921

4 Claims. (Cl. 188—106)

This invention relates to brakes for motor vehicles, and more particularly to a combined service and emergency brake.

Broadly the invention comprehends a brake having a duplex actuating means including a fluid pressure means for actuating the friction elements of the brake and mechanical means for actuating the same friction elements.

In a preferred embodiment of the invention a fluid pressure actuated motor operative to move the friction elements into engagement with the drum includes means for inhibiting retrograde movement of the fluid in the motor due to drum distortion, and the mechanical actuating means includes an assembly of an actuator and adjustable anchors for the friction elements.

An object of the invention is to provide a fluid pressure actuated motor having means inhibiting retrograde movement of the fluid in the motor during energization thereof.

Another object of the invention is to provide a brake having an auxiliary actuator for the friction elements of the brake arranged intermediate adjustable anchors for the friction elements and operative to apply force to the friction elements through the anchors.

Other objects and advantages of the invention will appear from the following description taken in connection with the drawings forming a part of this specification, and in which—

Fig. 1 is a vertical sectional view of the brake just back of the head of the drum illustrating the invention as applied;

Fig. 2 is a sectional view substantially on line 2—2, Fig. 1;

Fig. 3 is a sectional view substantially on line 3—3, Fig. 1;

Fig. 4 is a sectional view substantially on line 4—4, Fig. 1;

Figure 5:
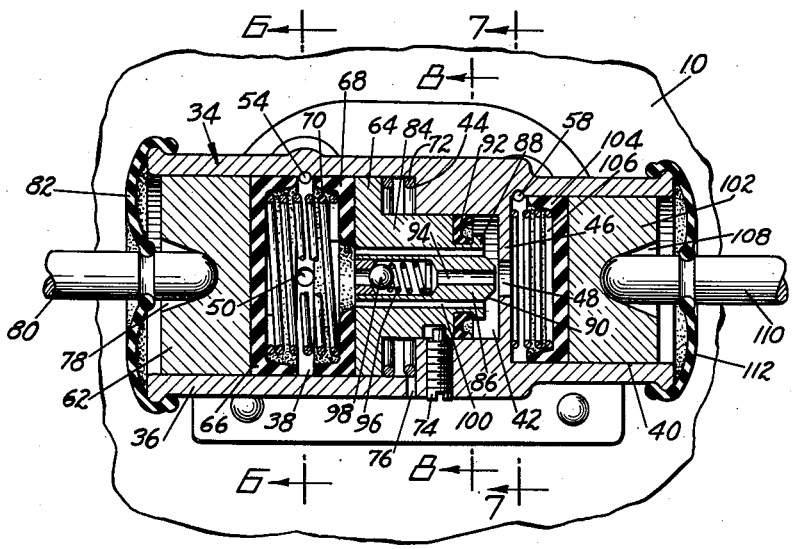
Fig. 5 is a longitudinal sectional view of the fluid pressure actuated motor.
Figures 6, 7:
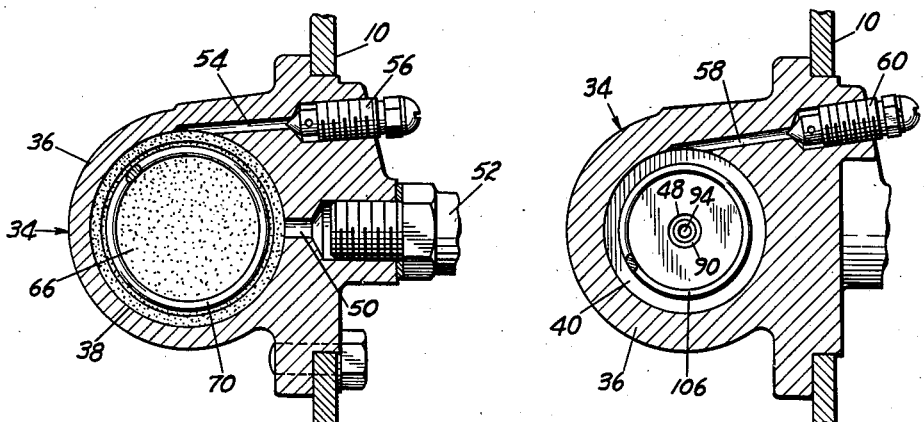
Fig. 6 is a sectional view substantially on line 6—6, Fig. 5.
Fig. 7 is a sectional view substantially on line 7—7, Fig. 5.
Figure 8:
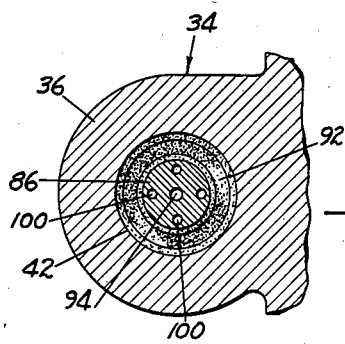
Fig. 8 is a sectional view substantially on line 8—8 Fig. 5.

Referring to the drawings for more specific details of the invention, 10 represents a fixed support or backing plate adapted to be secured to an axle or to an axle housing. The backing plate has associated therewith a rotatable drum 12 adapted to be secured to a wheel, and a pair of corresponding interchangeable friction elements or shoes 14 and 16 are mounted on the backing plate for cooperation with the drum.

The brake shoe 14 is a forward braking shoe and the brake shoe 16 is a trailing brake shoe. Each of the braking shoes includes a web 18 supporting a rim 20 having secured thereto a suitable lining 22 for frictionally engaging the drum. An assembly of an auxiliary actuating means and adjustable anchors indicated generally at 24 is mounted on the backing plate. The anchors of this assembly receive the articulate ends of the shoes 14 and 16, and corresponding oppositely disposed adjustable anchors 26 regulated by a turn buckle 28, also mounted on the backing plate, receive the separable ends of the shoes.

A retractile spring 30 connects the shoes adjacent their articulate ends, and a corresponding retractile spring 32 connects the shoes adjacent their separable ends. These springs serve to return the shoes from their applied positions to their retracted or off positions, and to retain the shoes when in their retracted positions against the anchors of the assembly 24 and the anchors 26, where they are supported in proper spaced relation to the drum.

The prime actuator for the brake includes a fluid pressure actuated motor 34 mounted on the backing plate between and connected to the separable ends of the shoes 14 and 16. The motor comprises a cylinder 36 having a large chamber 38, a relatively small chamber 40, and an intermediate chamber 42, all concentric to and communicating with one another.

One end of the intermediate chamber 42 opens directly into the large chamber 38, and at the junction of the large and intermediate chambers is an annular shoulder 44. The other end of the intermediate chamber is closed as by a head 46 having an axial port 48 providing a communication between the intermediate and the small chambers.

The large chamber 38 has a port 50 connected as by a fluid pressure delivery tube 52 to a suitable source of fluid including a fluid pressure producing device. The chamber 38 also has a port 54 normally closed as by a bleeder screw 56, and, correspondingly, the small chamber 40 has a port 58 normally closed as by a bleeder screw 60.

Oppositely disposed pistons 62 and 64 reciprocable in the large chamber 38 have upon their respective heads sealing cups 66 and 68, one of which, the cup 68, has an axial opening. A spring 70 interposed between the cups serves to retain the cups against displacement and also to retain the pistons in proper spaced relation to one another when in retracted position, and a spring 72 interposed between the back of the piston 64 and the annular shoulder 44 normally urges the piston 64 against a stop 74, and arranged in the wall of the cylinder adjacent the annular shoulder is an air vent 76.

The piston 62 has in its back a recess 78 receiving one end of a thrust pin 80. The other end of the thrust pin is suitably connected to the forward braking shoe 14, and a shield 82 sleeved on the thrust pin embraces the open end of the large chamber 38 for the exclusion of dust and other foreign substances from the cylinder.

The piston 64 has a concentric extension 84 movable in the intermediate chamber 42, and this extension has a reduced end portion 86 provided with an annular shoulder 88 and a frustro-conical end 90 adapted to enter and close the port 48. A sealing cup 92 sleeved on the reduced portion 86 and seated on the extension 84 is held against displacement by the annular shoulder 88. The piston 64 has an axial passage 94 extending therethrough, and in this passage is a valve chamber 96 having therein a spring-pressed ball valve 98 for controlling the passage. The piston also has a plurality of spaced passages 100 extending therethrough.

A piston 102 reciprocable in the small chamber 40 has on its head a sealing cup 104, and a spring 106 interposed between the cup and the head 64 serves to retain the cup against displacement and also to retain the piston in proper spaced relation to the head 46 when the piston is in its retracted position. A recess 108 in the back of the piston 102 receives one end of a thrust pin 110. The other end of the thrust pin is suitably connected to the trailing brake shoe 16; and a shield 112 sleeved on the thrust pin embraces the open end of the chamber 40 for the exclusion of dust and other foreign substances from the chamber.

The assembly of the auxiliary actuator and adjustable anchors indicated generally at 24 includes a plate 114 suitably secured to the backing plate. This plate has spaced openings 116 and 118 and an intermediate opening 120 registering with correspondingly arranged openings in the backing plate. The plate 114 also has its respective ends channeled to provide oppositely disposed guide-ways 122 and 124 having slidably mounted therein corresponding anchor blocks 126 and 128. An adjustable eccentric 130 mounted in the block 126 provides an anchor for the articulate end of the forward braking shoe 14, and a similar adjustable eccentric 132 mounted in the block 128 provides an anchor for the articulate end of the trailing brake shoe 16. The eccentrics are accessible through the openings 116 and 118 in the plate 114, and the registering openings in the backing plate and the latter openings are normally closed by removable cover plates 134 and 136.

A sleeve 138 is suitably secured on the backing plate in registration with the opening 120 in the plate 114 and the corresponding opening in the backing plate, and mounted for oscillation in the sleeve and the registering openings is a shaft 140 having thereon a cam 142 disposed between the anchor blocks 126 and 128. A plate or washer 144 suitably secured on the shaft and flapped against the anchor blocks serves to retain the anchors against displacement. The shaft extends beyond the sleeve for the reception of an operating lever 146 connected as by a rod 148 to a suitably actuating lever, not shown.

In a normal operation, when used as a service brake, upon energization of the fluid pressure actuated motor 34, fluid under pressure entering the large chamber 38 of the cylinder 36 causes movement of the piston 62 on its compression stroke, resulting in actuation of the forward braking shoe 14; and simultaneously with this operation fluid is displaced from the chamber 38 through the passages 100 in the piston 64 into the intermediate chamber 42, thence through the port 48 into the small chamber 40, causing movement of the piston 102 on its compression stroke, resulting in actuation of the trailing brake shoe 16.

As the pistons 62 and 102 move on their compression strokes, the piston 64 also moves against the resistance of the spring 72 and seats the conical end 90 on the extension 84 of the piston 64 in the port 48, and thereafter, as the pressure on the fluid in the large chamber 38 builds up, fluid is displaced from the large chamber through the passage 94, past the valve 98 in the piston 64, into the small chamber 40.

Under these conditions, should the drum expand due to heat generated in a braking operation, the fluid in the small chamber becomes trapped and maintains a constant pressure in the small chamber, tending to retain the piston 102 against movement. This results in retaining the trailing shoe 16 against movement toward its retracted position, and, accordingly, checks distortion of the drum.

Upon release of the brake the pistons 62 and 102 are moved to their retracted positions and the fluid in the cylinder is returned to the source of supply under the influence of the retractile spring 32 connecting the shoes 14 and 16. Simultaneously with this movement of the pistons 62 and 102, the piston 64 moves to its retracted position under the influence of the spring 72, and this movement of the piston 64 results in opening the port 48 and establishing communication between the chambers 38, 40 and 42 of the cylinder.

When operated as an emergency or parking brake, force is applied to the lever 146 through conventional linkage including a hand lever, not shown, and a pull rod 148. This results in moving the lever 146 through an angle, and this movement of the lever is transmitted to the operating shaft 140 and the cam 142 on the shaft. Upon this movement of the cam, force is transmitted therefrom in opposite directions to the slidable anchor blocks 126 and 128, resulting in spreading the anchor blocks apart, and, accordingly, moving the shoes 14 and 16 adjustably connected to the blocks into engagement with the drum.

At the conclusion of a braking operation, the applied force on the lever 146 is released and the lever is returned to its retracted or normal position under the influence of a retractile spring, not shown. As the lever 146 returns to its normal position, the cam also returns to its normal position, and, as the cam returns, the slidable anchor blocks 126 and 128 are urged by the retractile spring 30 to follow the cam, and, accordingly, the shoes 14 and 16 anchored on the anchor blocks are moved to their retracted positions.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A brake comprising a pair of corresponding friction elements, an adjustable anchor connected between adjacent ends of the elements, slidable anchor blocks adjustably connected to the other ends of the elements, and a cam intermediate the blocks.

2. A brake comprising a pair of corresponding friction elements, an adjustable anchor connected between adjacent ends of the elements, slidable anchor blocks adjustably connected to the other ends of the elements, a cam intermediate the anchor blocks, and a fluid pressure actuated motor connected between the elements.

3. A brake comprising a pair of corresponding interchangeable friction elements, an adjustable anchor including a turn buckle connecting adjacent ends of the friction elements, slidable anchor blocks adjustably connected to the other ends of the friction elements, guide-ways for the anchor blocks, a cam intermediate the anchor blocks, and a fluid pressure actuated motor connected between the friction elements.

4. A brake comprising a fixed support, a drum associated therewith, corresponding interchangeable friction elements arranged on the support for cooperation with the drum, an adjustable anchor on the support connecting adjacent ends of the friction elements, corresponding slidable anchor blocks adjustably connected to the other ends of the friction elements, spaced guide-ways for the anchor blocks, a cam intermediate the anchor blocks, means for actuating the cam, and a fluid pressure actuated motor on the support connected between the friction elements.

CLARENCE H. BOCK.